United States Patent
Borneman

[15] 3,690,567
[45] Sept. 12, 1972

[54] ELECTRIC ARC WELDING GUN HAVING A NOZZLE WITH A REMOVABLE METAL LINER TO PROTECT THE NOZZLE FROM WELD SPLATTER

[72] Inventor: Lawrence A. Borneman, 411 W. Ethel Ave., Lombard, Ill. 60148

[22] Filed: March 9, 1970

[21] Appl. No.: 17,361

[52] U.S. Cl. .............................. 239/591, 219/121 P
[51] Int. Cl. ............................................. B05b 1/00
[58] Field of Search ............... 239/591; 175/340, 393; 285/175, 334.4, 345, 238; 219/121 P

[56] References Cited

UNITED STATES PATENTS

| | | | |
|---|---|---|---|
| 3,562,486 | 2/1971 | Hatch et al. | 219/121 P |
| 2,944,140 | 7/1960 | Giannini et al. | 219/121 P |
| 1,950,947 | 3/1934 | Mulroyan | 285/176 |
| 1,039,354 | 9/1912 | Bonadio | 285/175 X |
| 1,794,955 | 3/1931 | Gordon | 285/334.4 X |
| 2,682,429 | 6/1954 | Fortino | 239/591 |
| 1,538,007 | 5/1925 | Schellin | 285/345 X |
| 2,896,698 | 7/1959 | Zebrick | 239/591 X |

FOREIGN PATENTS OR APPLICATIONS

| | | | |
|---|---|---|---|
| 205,512 | 1/1957 | Australia | 239/591 |

Primary Examiner—M. Henson Wood, Jr.
Assistant Examiner—Thomas C. Culp, Jr.
Attorney—Burmeister, Palmatier & Hamby

[57] ABSTRACT

The welding gun construction utilizes a nozzle member having an opening for directing an inert gas against the work to be welded. A tubular welding tip is disposed centrally within such opening to guide a welding wire toward the work. A welding arc is drawn between the work and the wire. A tubular metal liner is received within the opening to protect the nozzle member from weld splatter, which comprises molten metal globules thrown up from the welding area. The solidified weld splatter accumulates within the liner, which can be removed and disposed of as needed, before the weld splatter builds up to a thickness sufficient to cause a short circuit between the welding tip and the nozzle member. A new liner is then inserted into the nozzle. The liner is formed with a retaining element whereby the liner is held within the nozzle against accidental dislodgement. Such retaining element may take the form of an oval portion, one or more spring fingers bent outwardly from the liner, or a dimple portion formed by outward deformation of the liner. A pocket or tapered portion may be formed within the nozzle member to retain the outwardly projecting fingers or dimples. The liner may also be arranged for insertion into the nozzle from the rear, and may be retained in the nozzle by an outwardly projecting flange on the rear portion of the liner.

15 Claims, 16 Drawing Figures

INVENTOR
Lawrence A. Borneman
by Burmeister Palmatier
and Hamby Att'ys

ELECTRIC ARC WELDING GUN HAVING A NOZZLE WITH A REMOVABLE METAL LINER TO PROTECT THE NOZZLE FROM WELD SPLATTER

This invention relates to a new and improved construction for welding guns of the type utilizing a nozzle to direct inert gas against the work to be welded so as to shield the welding area from exposure to the oxygen and nitrogen in the surrounding atmosphere. A welding gun of this type generally utilizes a guide tube having a tip portion within the nozzle to guide a welding wire or rod toward the work. The welding arc is drawn between the work and the welding wire or rod. The guide tip for the welding wire is disposed axially in the nozzle opening, so that the stream of inert gas surrounds and encloses the wire and the welding arc.

Problems have been encountered in connection with such welding guns, due to the accumulation of weld splatter within the nozzle, particularly near its front end, which has the maximum exposure to the arc. The weld splatter comprises globules of molten metal which are thrown up into the nozzle during the welding operation. The globules solidify when they strike the inside of the nozzle, and many of them adhere to the nozzle. The accumulation of the weld splatter gradually builds up until it may cause a short circuit between the central welding tip and the nozzle. The accumulated weld splatter also obstructs the flow of the inert gas.

When the nozzle becomes clogged, the nozzle must be removed and cleaned out, or replaced with a new nozzle. The removal of the accumulated weld splatter can be a difficult operation and may require the reboring or reaming of the opening in the nozzle. The necessity for removing the weld splatter shortens the useful life of the nozzle.

One principal object of the invention is to eliminate the problems due to the accumulation of weld splatter in welding nozzles.

Thus, the present invention preferably provides a disposable metal liner which is inserted into the welding nozzle to protect the nozzle from weld splatter. One or more retaining elements are provided on the liner to hold it within the opening in the nozzle, against accidental dislodgment. Instead of being deposited on the inner surface of the nozzle, the weld splatter is deposited on the liner. When the wall splatter builds up to excessive thickness, the liner is simply removed and replaced with a new liner. The cost of the liner is very small, because it may be made of thin sheet metal, or in the form of a thin-walled tube. It is an easy matter to slip the old liner out of the nozzle and to slip in a new liner.

The liner may be retained by forming a portion of its annular wall in an oval shape so that the oval portion must be compressed to insert the liner into the nozzle. When the liner has been inserted, the oval portion springs outwardly so that the liner is frictionally retained in the nozzle.

An alternative construction is to form outwardly projecting elements on the liner, for frictionally engaging the inside of the nozzle. Such projections may take the form of spring fingers or dimple shaped protrusions. In some cases, the nozzle may be formed with an internal annular groove, or an internal tapered surface, to engage the outward projections on the liner.

Another alternative construction is to split the liner so that it has a gap in its circumference. The liner is made larger than the opening in the nozzle so that the liner must be compressed for insertion into the opening. The liner then springs outwardly and is frictionally retained.

The liner may also be arranged for insertion into the nozzle from the rear end thereof. This requires removal of the nozzle from the welding gun. The liner is retained by an outward flange or other similar element thereon, adapted to engage a shoulder within the nozzle. The liner may be held against the shoulder by a sleeve or bushing within the nozzle.

Further objects, advantages and features of the present invention will appear from the following description, taken with the accompanying drawings, in which.

Figure 1:
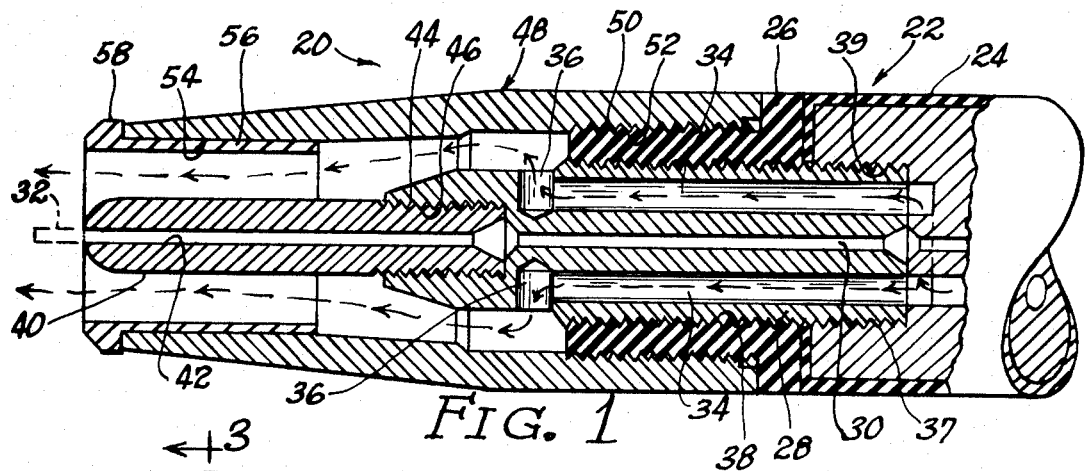
FIG. 1 is a longitudinal section taken through a welding gun, to be described as an illustrative embodiment of the present invention.

FIG. 1 considered in greater detail, illustrates an embodiment of the invention, in the form of a nozzle assembly 20 for a welding gun 22. It will be seen that the welding gun 22 comprises a body 24 which may be made of metal covered with rubber or some other insulating material. Any other suitable material may be employed in the body 24.

As illustrated, an adapter bushing or extension 26 is mounted on a tubular guide 28, which in turn is mounted on the body 24. An axial bore 30 is formed in the tubular guide 28 to receive the welding member 32, which is illustrated as a wire but may comprise a rod or the like. It will be understood that the welding arc is drawn between the wire 32 and the work to be welded.

Passages 34 are formed in the tubular guide 28 to carry the inert gas, which may comprise helium or argon, for example. The passages 34 extend longitudinally along the tubular guide 28 and connect with ports 36 which extend outwardly near the outer end of the guide 28.

As shown, the tubular guide 28 has an externally threaded portion 37 which is mated with an internally threaded bore 38 in the adapter bushing 26. Preferably, the bushing 26 is made of electrically insulating material. The guide 28 may be screwed into an internally threaded bore 39 in the body 24.

The tubular guide 28 is fitted with a removable welding tip member 40 having an axial bore 42 therein adapted to carry the welding wire 32. The tip member 40 is made of copper or some other electrically conductive material because it carries the welding current to the wire 32. As shown, the tip member 40 has an externally threaded inner end portion 44, adapted to be screwed into an internally threaded bore 46 in the guide 28. Because it carries the welding current, the guide 28 is made of metal or some other electrically conductive material.

A nozzle member 48 is removably connected to the body 24 of the welding gun 22. Preferably, the nozzle member 48 is mounted on the bushing 26 which serves as an extension of the body 24. Screw threaded elements are employed in this case to connect the nozzle member 48 to the bushing 26. Thus, the bushing 26 has an externally threaded portion 50, adapted to receive an internally threaded portion 52 on the rear end of the nozzle member 48.

The nozzle 48 is preferably made of metal, such as copper, brass, aluminum or the like. A bore or opening 54 is formed in the nozzle 48 to carry the stream of inert gas. It will be seen that the welding tip 40 is centrally disposed in the opening 54. Thus, the stream of inert gas surrounds and shields the welding wire 32 and the welding arc. The opening 54 in the nozzle 48 is illustrated as being cylindrical, but it may be tapered in some cases.

In accordance with the present invention, the nozzle 48 is provided with a liner or insert 56 to protect the nozzle from weld splatter. The liner 56 is tubular in form and is inserted into the front end of the opening 54. Thus, the liner 56 protects the portion of the nozzle which is exposed to the heat of the arc and the splattering of metal from the welding area. The liner 56 is made of metal such as brass, copper, aluminum or the like.

The front end of the liner 56 is preferably provided with an outwardly projecting flange 58 or some similar element, to engage the front end of the nozzle 48 so as to limit the extent to which the liner 56 is inserted into the opening 54. The flange 58 also makes it easy to remove the liner 56 from the nozzle 48. In addition, the flange 58 protects the front edge of the nozzle 48 from weld splatter. Furthermore, the flange 58 may be slightly larger in diameter than the adjacent portion of the nozzle 48, the better to shed and deflect weld splatter away from the outside of the nozzle.

Figure 2:
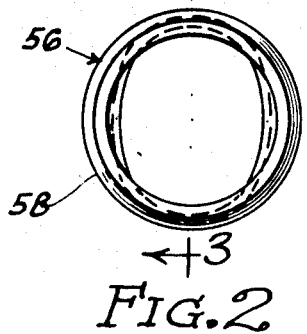
FIG. 2 is a front elevation of a disposable metal liner, adapted to be inserted and retained within the welding nozzle shown in FIG. 1.
Figure 3:
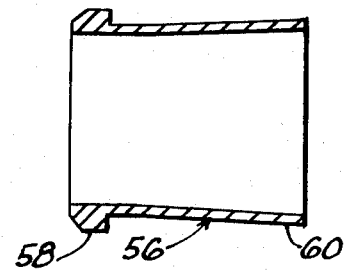
FIG. 3 is a longitudinal section taken along the line 3—3 in FIG. 2.
Figure 4:
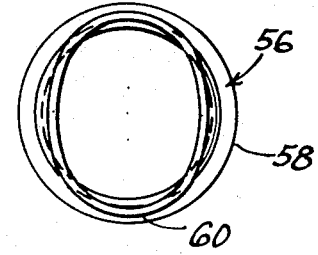
FIG. 4 is a rear elevation of the liner.

Means are provided on the liner 56 to retain the liner within the nozzle 48 against accidental dislodgement. However, the liner 56 is retained in such a way that it is easy to remove when it needs to be replaced. In the construction shown in FIGS. 2–4, the liner 56 is generally cylindrical in shape, but is formed with a rear end portion 60 which is oval or out of round, as shown to best advantage in FIG. 4. The major dimension of the oval portion 60 is greater than the diameter of the opening 54, so that the oval portion 60 must be compressed in order to insert the liner 56 into the opening 54. When the liner 56 is inserted, the oval portion 60 springs outwardly so that it frictionally engages the nozzle 48 within the opening 54. Due to this frictional engagement, the liner 56 is retained in the opening 54 against accidental dislodgement. However, the liner 56 can easily be removed so that it can be replaced with a new liner when the weld splatter accumulates to an excessive extent on the old liner. The liner 56 is made of thin metal so that it can easily be sprung or compressed when it is to be inserted into the opening 54 in the nozzle 48.

Figure 5:
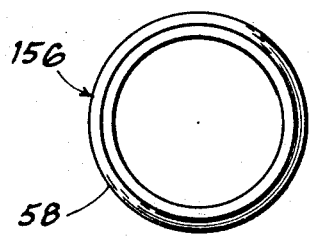
FIG. 5 is a front elevation of a modified liner utilizing spring fingers to retain the liner in the welding nozzle.
Figure 6:
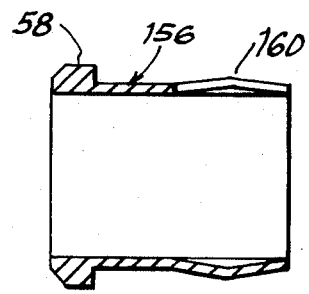
FIG. 6 is a longitudinal section, taken generally along the line 6—6 in FIG. 7.
Figure 7:
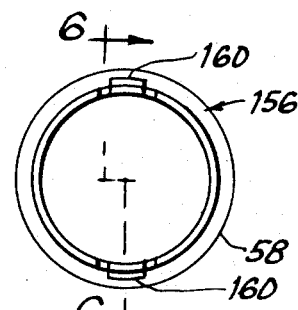
FIG. 7 is a rear elevation of the liner shown in FIGS. 5 and 6.
Figure 8:
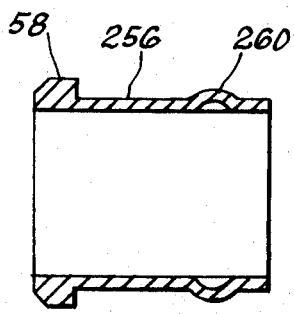
FIG. 8 is a longitudinal section taken along the line 8—8 in FIG. 9, and showing another modified liner utilizing outwardly formed dimples to retain the liner in the welding nozzle.
Figure 9:
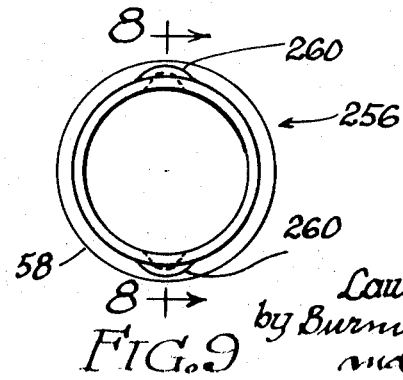
FIG. 9 is a rear elevation of the liner shown in FIG. 8.

FIGS. 5–7 illustrate a modified liner 156 which is formed with outwardly projecting elements for frictionally engaging the inside of the nozzle 48. Such outwardly projecting elements take the form of one or more spring fingers 160 which are struck from the metal wall of the liner. It will be seen that fingers 160 are bent or bowed outwardly for frictional engagement with the nozzle 48 within the opening 54. The spring fingers 160 engage the nozzle 48 within the opening 54. The spring fingers 160 engage the nozzle 48 with sufficient force to prevent accidental dislodgement of the liner 156. However, the liner 156 can easily be removed from the opening 54 in the nozzle 48. In other respects, the liner 156 of of FIGS. 5–7 is the same as the liner 56 of FIGS. 2–4. Another modified liner 256 is shown in FIGS. 8 and 9. Here again, the liner 256 is generally cylindrical in shape, but is formed with one or more outwardly projecting dimples 260 for frictionally engaging the nozzle 48 within the opening 54. The dimples 260 are produced by outward deformation of the cylindrical wall of the liner 256. Two such dimples are shown in FIGS. 8 and 9. The illustrated dimples 260 are spherically curved in shape.

When the liner 256 is inserted into the opening 54, the dimples 260 cause compression of the liner so that the dimples are pressed outwardly into firm frictional engagement with the nozzle 48.

Figure 10:
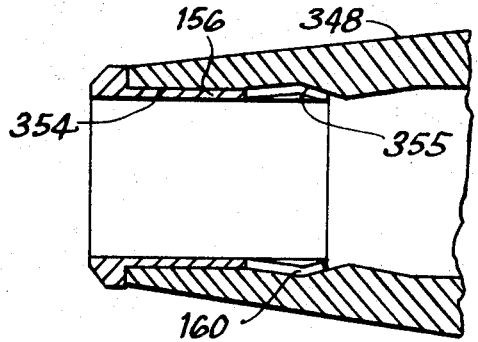
FIG. 10 is a fragmentary longitudinal section showing a modified nozzle construction, providing an internal groove or pocket to assist in the retention of the liner.
Figure 11:
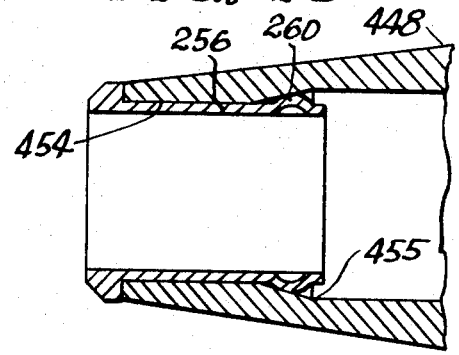
FIG. 11 is a fragmentary longitudinal section showing another modified nozzle construction, utilizing a tapered internal surface to assist in retaining the liner.

The nozzle 48 of FIG. 1 has a cylindrical bore which is frictionally engaged by the outwardly projecting element on the liner. However, as illustrated in FIGS. 10 and 11, the nozzle may be modified to assist in the retention of the liner. Thus, FIG. 10 illustrates a modified nozzle 348 having a bore or opening 354. The nozzle 348 is the same as previously described, except that a pocket or groove 355 is formed in the bore 354. In FIG. 10, the liner 156 of FIGS. 5–7 is shown in the bore 354. It will be seen that the spring fingers 160 are adapted to spring outwardly into the groove 355. Thus, the liner 156 is more securely retained in the bore 354. It will be understood that the liner 256 of FIGS. 8 and 9 can also be inserted into the bore 354. In that case, the outwardly projecting dimples 260 will be received in the pocket or groove 355.

FIG. 11 illustrates another modified nozzle 448 having a bore or opening 454. In this case, the nozzle 448 is formed with a tapered annular surface 455 which connects with the rear end of the bore 454. It will be seen that the liner 256 of FIGS. 8 and 9 is mounted within the bore 454. The dimples 260 are in engagement with the tapered surface 455. As the liner 256 is inserted into the nozzle 448, the dimples 260 spring outwardly when they encounter the tapered surface 455. It will be understood that the liner 156 of FIGS. 5–7 can also be inserted into the bore 454. In that case, the fingers 160 spring outwardly to engage the tapered surface 455.

Figure 12:
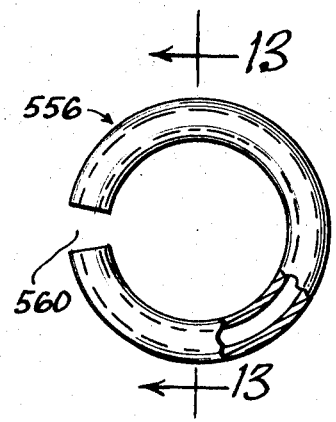
FIG. 12 is a front elevation of another modified liner which is split to form a gap in its circumference.
Figure 13:
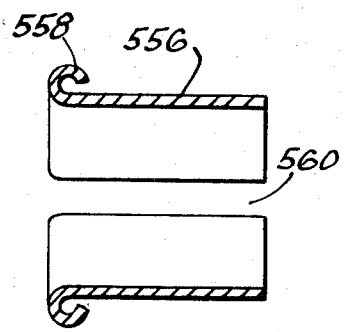
FIG. 13 is a central longitudinal section taken generally along the line 13—13 in FIG. 12.
Figure 14:
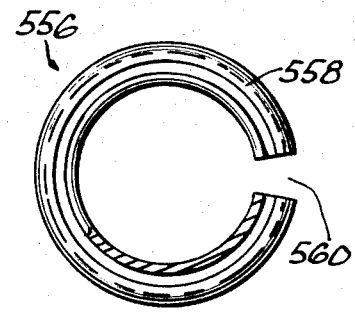
FIG. 14 is a rear elevation of the liner shown in FIGS. 12 and 13.

FIGS. 12–14 illustrate another modified liner 556 which is generally cylindrical in shape but is formed with an outwardly projecting flange 558 at its front end. In this case, the flange 558 is rolled or curled from the wall of the liner 556.

To provide for retention of the liner 556, it is split so that a gap 560 is formed in its circumference. The initial diameter of the liner 556 is made greater than the diameter of the opening 54 in the nozzle 48. Thus, the liner 556 must be compressed when it is to be inserted into the opening 54. Such compression closes the gap 560 or at least reduces its width. When the liner 556 has been inserted, it springs outwardly into frictional engagement with the nozzle 48 within the opening 54. The flange 558 increases the stiffness of the liner 556 so that the spring pressure between the liner and the nozzle is increased. The flange 558 makes it easy to grip the liner 556 when it is to be removed from the nozzle 48.

Figure 16:
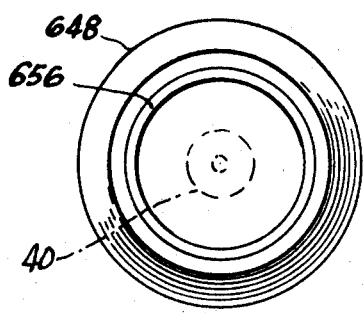
FIG. 16 is a front elevation of the construction shown in FIG. 15.
Figure 15:
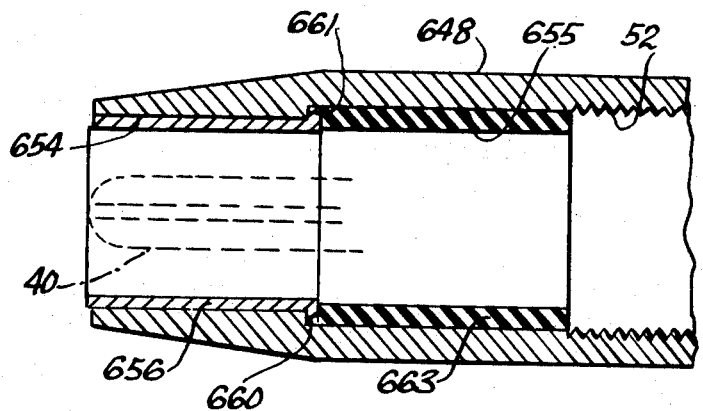
FIG. 15 is a fragmentary longitudinal section showing another modified liner and nozzle construction.

FIGS. 15 and 16 illustrate a modified construction in which both the nozzle and the liner are modified. The liner is inserted from the rear of the nozzle rather than from the front. Thus, the nozzle must be unscrewed from the welding gun when the liner is to be inserted.

Specifically, FIGS. 15 and 16 illustrate a modified nozzle 648 having a bore or opening 654 therein. Behind the bore 654, the nozzle 648 has an enlarged bore 655. As previously described, the internally threaded portion 52 is to the rear of the enlarged bore 655.

A liner 656 is adapted to be inserted into the bore 654 through the enlarged bore 655 to the rear of the bore 654. The liner 656 is generally cylindrical but is retained by an outwardly projecting flange or other element 660 at the rear end thereof. The flange 660 is of such a size that it can be inserted through the enlarged bore 655. The flange 660 is engageable with a rearwardly facing shoulder 661 which is formed within the nozzle 648 between the bore 654 and enlarged bore 655. The shoulder 661 retains the liner 656 against forward movement out of the nozzle 648.

To prevent rearward movement of the liner 656 it is preferred to provide a bushing or sleeve 663 within the enlarged bore 655 behind the flange 660. The bushing 663 is preferably made of an electrically insulating material, such as a heat resistant plastic. When the nozzle 648 is screwed onto the bushing 26 the bushing 663 engages the bushing 26 and is pushed forwardly so that it pushes the flange 660 against the shoulder 661.

I claim:

1. An electric arc welding gun construction, comprising a metal nozzle member having an axial generally cylindrical opening of substantially circular cross section in the outer end portion of said nozzle member for directing an inert gas against the work to be welded, a tubular metal generally cylindrical tip member disposed centrally in said generally cylindrical opening and having an axial guide bore therein, a consumable arc welding member slidably movable through said bore and extending out of said tip member and beyond said opening and the outer end portion of said nozzle member for movement toward the work, and a tubular generally cylindrical metal liner removably slip fitted within said generally cylindrical opening for protecting said nozzle member from weld splatter, said metal liner having a substantially larger inner size than the outer size of said tip member to provide an annular space therebetween for the passage of the inert gas, said liner having a retaining element for removably holding said liner in said nozzle member against accidental dislodgment.

2. A welding gun construction according to claim 1, in which said retaining element of said liner comprises a wall portion thereof formed into an oval shape and having a maximum dimension greater than the diameter of said generally cylindrical opening whereby said wall portion must be compressed to provide for insertion of said liner into said opening, said wall portion being effective to spring outwardly against said nozzle to retain said liner in said opening.

3. A welding gun construction according to claim 1, in which said retaining element comprises at least one wall portion projecting outwardly from said liner and frictionally engageable with said nozzle member within said generally cylindrical opening.

4. A welding gun construction according to claim 3, in which said nozzle member is formed with a pocket within said generally cylindrical opening for receiving and retaining said outwardly projecting wall portion.

5. A welding gun construction according to claim 3, in which said wall portion comprises a spring finger struck from said liner and bent outwardly therefrom for frictional engagement with said nozzle member within said generally cylindrical opening.

6. A welding gun construction according to claim 3, in which said wall portion comprises an outwardly projecting dimple-shaped deformation on said liner and frictionally engageable with said nozzle member within said generally cylindrical opening.

7. A welding gun construction according to claim 4, in which said nozzle member is formed with a tapered surface within said generally cylindrical opening for engaging and retaining said wall portion.

8. A welding gun construction according to claim 1, in which said liner comprises means forming an open split in the circumference thereof and extending entirely through the wall of said liner, said liner being of a dimension greater than the size of said opening whereby said liner must be compressed for insertion into said generally cylindrical opening, said liner being effective to spring outwardly against said nozzle member to retain said liner within said generally cylindrical opening.

9. A welding gun construction according to claim 8, in which said liner comprises a rolled flange projecting outwardly from one end of said liner and affording increased spring resistance to the compression of said liner, said split extending through said flange.

10. A welding gun construction according to claim 1, including an annular flange projecting outwardly from the front end of said liner for engaging the front end of said nozzle member to limit the extent of the insertion of said liner into said generally cylindrical opening and to protect the tip of the nozzle from weld splatter.

11. A welding gun construction according to claim 10, in which said annular flange is rolled from the body of said liner.

12. A welding gun construction according to claim 1, in which said retaining element comprises a rear end portion projecting outwardly from said liner, said nozzle member having a rearwardly facing annular shoulder in said generally cylindrical opening for engagement by said rear end portion to restrain said liner against forward movement, said liner being insertable into said nozzle member from the rear end thereof.

13. A welding gun construction according to claim 12, in which said rear end portion comprises an outwardly projecting annular flange on the rear end of said liner.

14. A welding gun construction according to claim 12, including means within said nozzle member and behind said liner for retaining said rear end portion thereof against said annular shoulder.

15. A welding gun construction according to claim 12, including a bushing within said nozzle member and behind said liner for retaining said rear end portion against said annular shoulder.

* * * * *